United States Patent
Imazeki et al.

(10) Patent No.: US 12,002,283 B2
(45) Date of Patent: Jun. 4, 2024

(54) DETECTION DEVICE AND DISPLAY DEVICE

(71) Applicant: Japan Display Inc., Tokyo (JP)

(72) Inventors: Yoshikatsu Imazeki, Tokyo (JP); Yoichi Kamijo, Tokyo (JP); Koichi Miyasaka, Tokyo (JP); Shuichi Osawa, Tokyo (JP); Yoshifumi Kamei, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 17/949,824

(22) Filed: Sep. 21, 2022

(65) Prior Publication Data

US 2023/0019559 A1      Jan. 19, 2023

Related U.S. Application Data

(63) Continuation of application No. PCT/JP2021/009078, filed on Mar. 8, 2021.

(30) Foreign Application Priority Data

Mar. 26, 2020  (JP) ................. 2020-056649

(51) Int. Cl.
   *G06V 40/13*      (2022.01)
   *G06F 3/044*      (2006.01)
(52) U.S. Cl.
   CPC ........ *G06V 40/1306* (2022.01); *G06F 3/0445* (2019.05); *G06F 3/0446* (2019.05)
(58) Field of Classification Search
   CPC . G06V 40/1306; G06F 3/0445; G06F 3/0446; G06F 3/0448

(Continued)

(56) References Cited

U.S. PATENT DOCUMENTS

| 11,062,111 B2 | 7/2021 | Kurasawa et al. |
| 11,086,464 B2 | 8/2021 | Mugiraneza et al. |

FOREIGN PATENT DOCUMENTS

| JP | 2015-210600 A | 11/2015 |
| JP | 2015210600 A | * 11/2015 |

(Continued)

OTHER PUBLICATIONS

International Search Report issued in International Patent Application No. PCT/JP2021/009078 dated Apr. 13, 2021 and English translation of same. 5 pages.

(Continued)

*Primary Examiner* — Amare Mengistu
*Assistant Examiner* — Gloryvid Figueroa-Gibson
(74) *Attorney, Agent, or Firm* — K&L Gates LLP

(57) ABSTRACT

A detection device includes a substrate, a plurality of drive electrodes disposed at the substrate, each extending in a first direction, and arranged in a second direction intersecting the first direction, and a plurality of detection electrodes opposed to the drive electrodes, each extending in the second direction, and arranged in the first direction. Each of the drive electrodes and the detection electrodes has a plurality of superimposed portions and a connecting portion connecting the superimposed portions, one of the superimposed portions of one of the drive electrodes and one of the superimposed portions of one of the detection electrodes are superimposed over each other and extend linearly in a same direction, and in a planar view from a direction perpendicular to the substrate, some of the superimposed portions and some of the connection portions form a first closed region closed annularly.

10 Claims, 13 Drawing Sheets

(58) Field of Classification Search
USPC .......................................................... 345/104
See application file for complete search history.

(56) References Cited

FOREIGN PATENT DOCUMENTS

| WO | WO2018/180845 A1 | 10/2018 |
| WO | WO2019/065937 A1 | 4/2019 |

OTHER PUBLICATIONS

Written Opinion issued in International Patent Application No. PCT/JP2021/009078 dated Apr. 13, 2021. 3 pages.

* cited by examiner

DETECTION DEVICE AND DISPLAY DEVICE

CROSS-REFERENCE TO RELATED APPLICATION

This application is a continuation of International Patent Application No. PCT/JP2021/009078 filed on Mar. 8, 2021 which designates the United States, incorporated herein by reference, and which claims the benefit of priority from Japanese Patent Application No. 2020-056649 filed on Mar. 26, 2020, incorporated herein by reference.

BACKGROUND

1. Technical Field

The present disclosure relates to a detection device and a display device.

2. Description of the Related Art

WO 2019/065937 describes a detection device that detects fingerprints based on change in capacitance between a drive electrode and a detection electrode. WO 2019/065937 describes, as an example of a sensor pattern of the detection device, a sensor pattern in which drive electrodes and detection electrodes are formed of metallic thin lines and extend in a zigzag line shape.

The light transmittance may decrease depending on the arrangement pitch or the pattern shape of drive electrodes and detection electrodes.

SUMMARY

A detection device according to an embodiment of the present disclosure includes a substrate, a plurality of drive electrodes disposed at the substrate, each extending in a first direction, and arranged in a second direction intersecting the first direction, and a plurality of detection electrodes opposed to the drive electrodes, each extending in the second direction, and arranged in the first direction. Each of the drive electrodes and the detection electrodes has a plurality of superimposed portions and a connecting portion connecting the superimposed portions, one of the superimposed portions of one of the drive electrodes and one of the superimposed portions of one of the detection electrodes are superimposed over each other and extend linearly in a same direction, and in a planar view from a direction perpendicular to the substrate, some of the superimposed portions and some of the connection portions form a first closed region closed annularly.

A display device according to an embodiment of the present disclosure includes the detection device above, and a display panel opposed to the detection device.

DETAILED DESCRIPTION

Modes for carrying out the disclosure (embodiments) will be described in detail with reference to the drawings. The present disclosure is not intended to be limited by the description of the following embodiments. The constituent elements described below include those easily conceivable by those skilled in the art and those substantially identical. Furthermore, the constituent elements described below can be combined as appropriate. What is disclosed herein is only by way of example, and any modifications easily conceivable by those skilled in the art without departing from the spirit of the disclosure are naturally embraced in the scope of the disclosure. For clarity of illustration, the drawings may be schematically represented in terms of width, thickness, shape, and the like of each part compared to the actual manner, but those are illustrated only by way of example and not intended to limit the interpretation of the present disclosure. In the present description and drawings, elements similar to those previously described with reference to the drawings are denoted by the same reference signs, and a detailed description thereof may be omitted if appropriate.

First Embodiment

Figure 1:
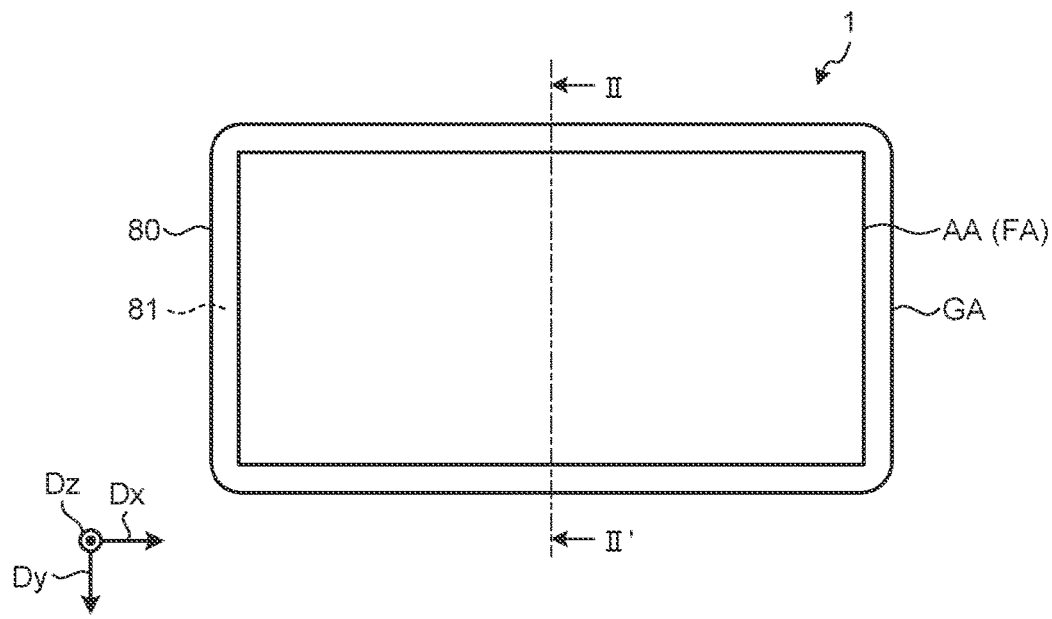
FIG. 1 is a plan view illustrating a display device according to a first embodiment.

FIG. 1 is a plan view illustrating a display device according to a first embodiment. A display device 1 illustrated in FIG. 1 is a display device with a fingerprint detecting function and has a display region AA for displaying images, a detection region FA, and a peripheral region GA provided outside the display region AA and the detection region FA. The detection region FA is a region for detecting a recess or protrusion on the surface of a finger or the like in contact with or in proximity to a cover member 80. In the display device 1, the display region AA and the detection region FA match or substantially match so that fingerprints can be detected over the entire display region AA. The shape of the display region AA and the detection region FA is, for example, rectangular.

In the following description, a first direction Dx is one direction in a plane parallel to a substrate 101 (see FIG. 3). A second direction Dy is one direction in the plane parallel to the substrate 101 and is a direction orthogonal to the first direction Dx. The second direction Dy may intersect the first direction Dx rather than being orthogonal. A third direction Dz is a direction orthogonal to the first direction Dx and the second direction Dy and is normal to the substrate 101. The term "planar view" indicates the positional relation when viewed from a direction perpendicular to one surface 101a of the substrate 101, that is, the third direction Dz.

Figure 2:
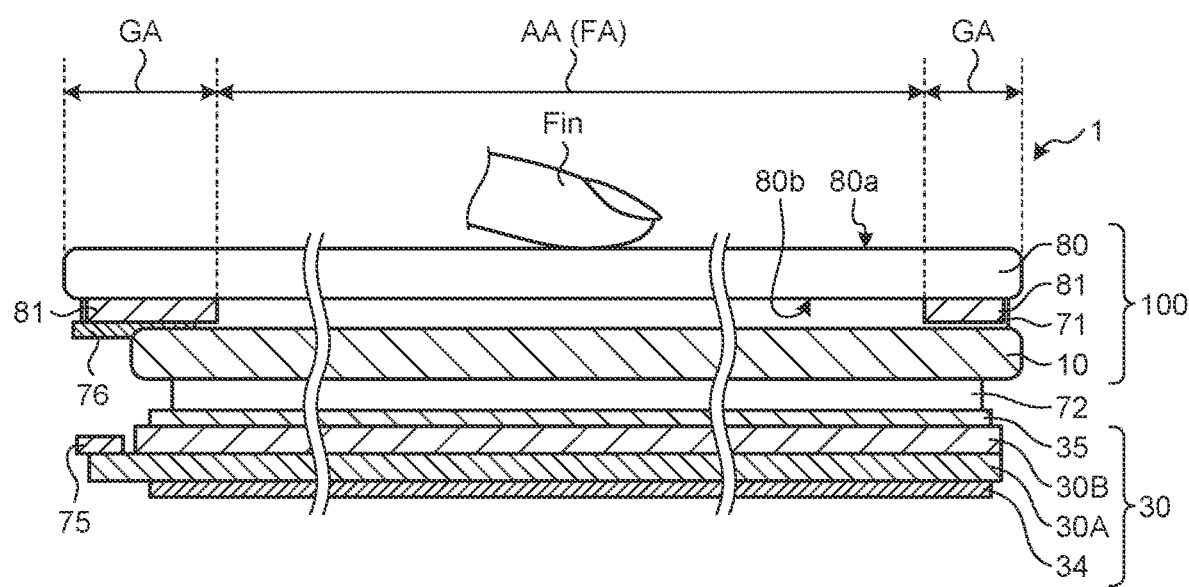
FIG. 2 is a cross-sectional view along II-II' in FIG. 1.

FIG. 2 is a cross-sectional view along II-II' in FIG. 1. As illustrated in FIG. 2, the display device 1 includes a display panel 30 and a detection device 100. The detection device 100 has a fingerprint sensor 10 and the cover member 80. The cover member 80 is a plate-shaped member having a first surface 80a and a second surface 80b on the side opposite to the first surface 80a. The first surface 80a of the cover member 80 is a detection surface for detecting a recess or protrusion on the surface of a finger or the like in contact or in proximity and is a display surface for a viewer to view an image on the display panel 30. The fingerprint sensor 10 and the display panel 30 are provided on the second surface 80b side of the cover member 80. The cover member 80 is a member for protecting the fingerprint sensor 10 and the display panel 30 and covers the fingerprint sensor 10 and the display panel 30. The cover member 80 is, for example, a glass substrate or a resin substrate.

The cover member 80, the fingerprint sensor 10, and the display panel 30 are not necessarily formed in a rectangular shape in a planar view and may be formed in a circular shape, an elliptical shape, or a variant form in which these outer shapes are partially missing. The cover member 80 is not necessarily shaped like a flat plate. For example, when the display panel 30 has a curved surface with curvature, the cover member 80 may also have a curved surface. In this case, the display device 1 is a curved display with a fingerprint detecting function and can detect a fingerprint even on the curved surface of the curved display.

In the peripheral region GA, a decorative layer 81 is provided on the second surface 80b of the cover member 80. The decorative layer 81 is a colored layer with a light transmittance lower than that of the cover member 80. The decorative layer 81 can suppress the visibility to the viewer of wiring, circuits, and the like superimposed on the peripheral region GA. In the example illustrated in FIG. 2, the decorative layer 81 is provided on the second surface 80b but may be provided on the first surface 80a.

The fingerprint sensor 10 is a detector for detecting a recess or protrusion on the surface of a finger Fin or the like in contact with or in proximity to the first surface 80a of the cover member 80. The fingerprint sensor 10 is provided between the cover member 80 and the display panel 30. When viewed from the third direction Dz, the fingerprint sensor 10 overlaps the detection region FA and a part of the peripheral region GA. A flexible substrate 76 is connected to the fingerprint sensor 10 in the peripheral region GA. A detection IC (not illustrated) for controlling the detection operation of the fingerprint sensor 10 is mounted on the flexible substrate 76.

The fingerprint sensor 10 has one surface bonded to the second surface 80b of the cover member 80 with an adhesive layer 71 interposed therebetween, and the other surface bonded to a polarizing plate 35 of the display panel 30 with an adhesive layer 72 interposed therebetween. The adhesive layer 71 and the adhesive layer 72 are adhesive or resin having light transmissivity and transmit visible light.

The display panel 30 has a pixel substrate 30A, a counter substrate 30B, a polarizing plate 34 on the lower side of the pixel substrate 30A, and the polarizing plate 35 on the upper side of the counter substrate 30B. A display IC (not illustrated) for controlling the display operation of the display panel 30 is connected to the pixel substrate 30A with a flexible substrate 75 interposed therebetween. The display panel 30 is a liquid crystal panel having a liquid crystal display element as a display function layer. The display panel 30 may be, for example, an organic EL display panel.

Figure 3:
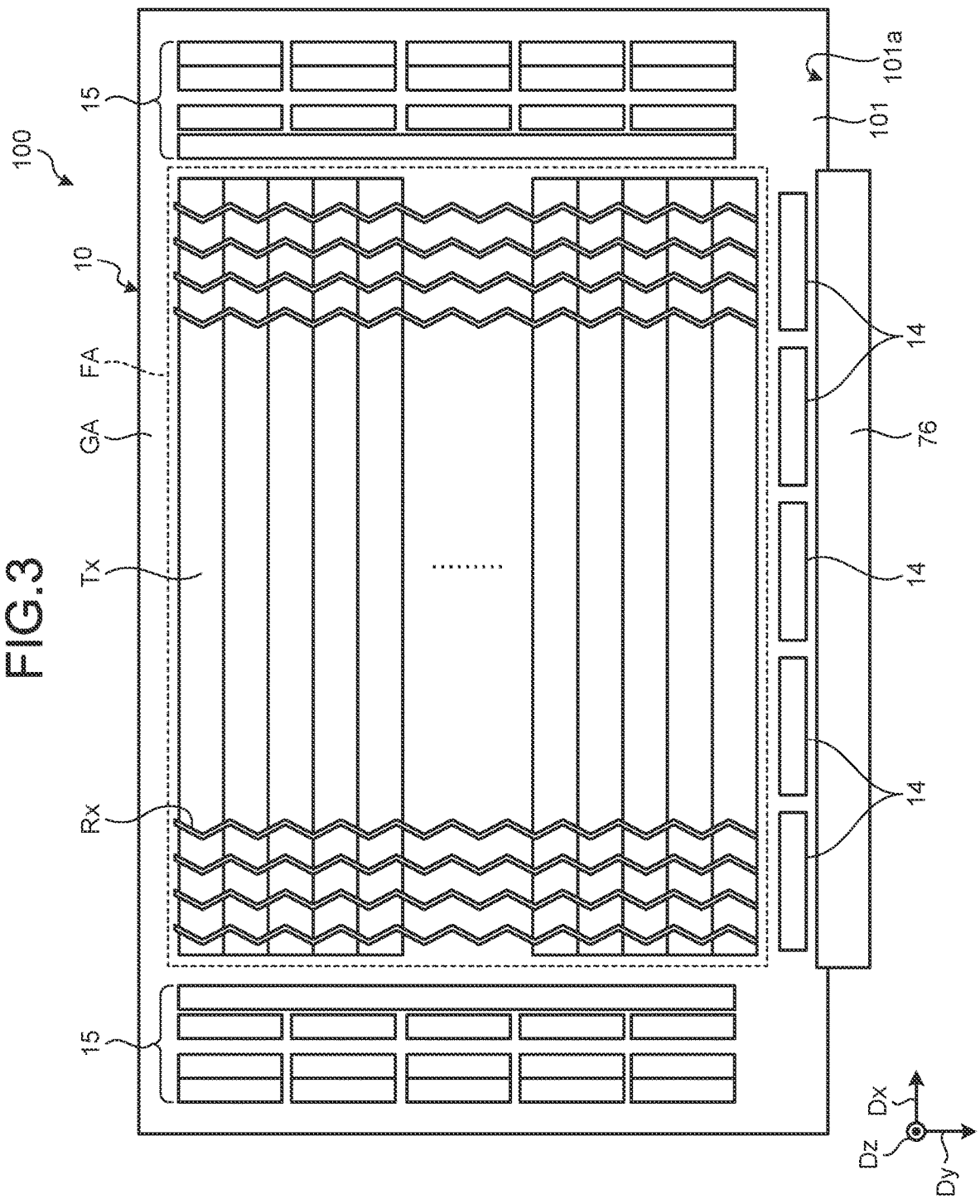
FIG. 3 is a plan view illustrating a configuration example of a detection device according to the first embodiment.

FIG. 3 is a plan view illustrating a configuration example of the detection device according to the first embodiment. As illustrated in FIG. 3, the detection device 100 includes the substrate 101 and the fingerprint sensor 10 provided on the one surface 101a side of the substrate 101. The fingerprint sensor 10 includes drive electrodes Tx and detection electrodes Rx. The detection electrodes Rx are stacked on the one surface 101a side of the substrate 101 in a positional relation of not being in contact with the drive electrodes Tx. When viewed from the finger Fin illustrated in FIG. 2, the detection electrodes Rx are located closer than the drive electrodes Tx. The drive electrodes Tx and the detection electrodes Rx are formed of metal wires. The substrate 101 is a glass substrate having light transmissivity to allow visible light to pass through. Alternatively, the substrate 101 may be a light-transmitting resin substrate or resin film made of a resin such as polyimide. The fingerprint sensor 10 is a sensor having light transmissivity.

The drive electrodes Tx and the detection electrodes Rx are provided in the detection region FA. The drive electrodes Tx each extend in the first direction Dx and are arranged in the second direction Dy. The detection electrodes Rx are opposed to the drive electrodes Tx, each extend in the second direction Dy, and are arranged in the first direction Dx. The detection electrodes Rx each extend in a direction intersecting the extending direction of the drive electrode Tx. Each detection electrode Rx is connected to the flexible substrate 76 provided on the substrate 101 with a detection electrode selection circuit 14 interposed therebetween. The planar shapes of the drive electrodes Tx and the detection electrodes Rx illustrated in FIG. 3 indicate the positional relation and do not necessarily correspond to specific planar shapes of the drive electrodes Tx and the detection electrodes Rx described below.

Capacitance is formed at each of the intersections of the detection electrodes Rx and the drive electrodes Tx. In the fingerprint sensor 10, when mutual capacitive touch detection operation is performed, a drive electrode driver 15 selects the drive electrodes Tx sequentially in a time-divisional manner and supplies a drive signal to the selected drive electrode Tx. A detection signal is output from the detection electrode Rx in response to a capacitance change caused by a recess or protrusion on the surface of a finger or the like in contact or in proximity. Fingerprint detection is thus performed. The drive electrode driver 15 may sequentially select and drive the drive electrode blocks each including the drive electrodes Tx.

In FIG. 3, various circuits such as the detection electrode selection circuit 14 and the drive electrode driver 15 are provided in the peripheral region GA of the substrate 101, but this is only by way of example. At least some of the various circuits may be included in the detection IC mounted on the flexible substrate 76.

Figure 4:
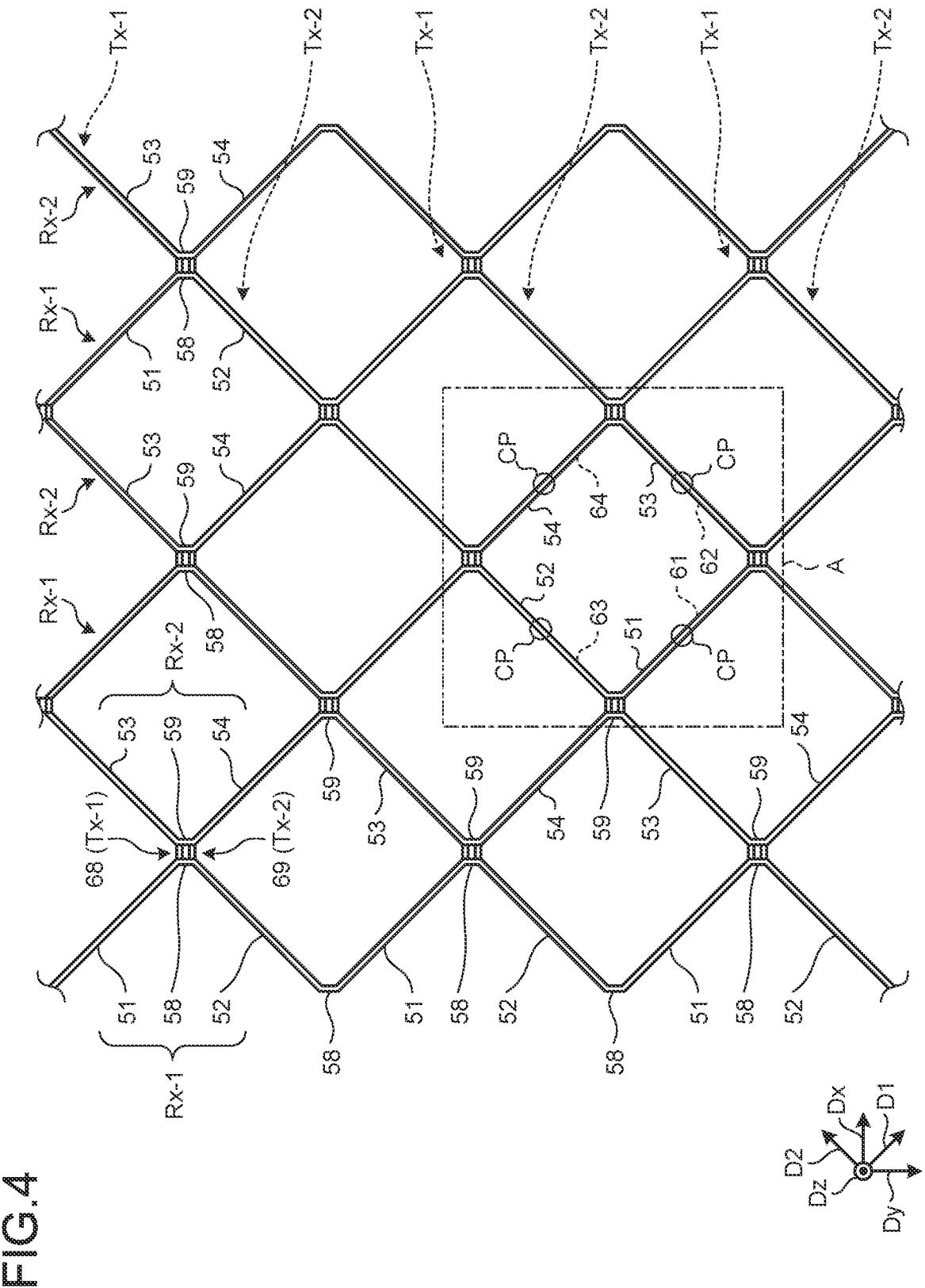
FIG. 4 is a plan view illustrating drive electrodes and detection electrodes according to the first embodiment.

The planar shapes of the drive electrodes Tx and the detection electrodes Rx will now be described. FIG. 4 is a plan view illustrating the drive electrodes and the detection electrodes according to the first embodiment. As illustrated in FIG. 4, the detection electrodes Rx each have a first detection electrode Rx-1 and a second detection electrode Rx-2. In the first direction Dx, the first detection electrodes Rx-1 and the second detection electrodes Rx-2 are disposed alternately. The second detection electrode Rx-2 is disposed at a predetermined distance in the first direction Dx from the first detection electrode Rx-1. The second detection electrode Rx-2 is disposed in line symmetry with the first detection electrode Rx-1 with respect to a virtual line parallel to the second direction Dy as the axis of symmetry.

In the following description, the first detection electrode Rx-1 and the second detection electrode Rx-2 may be simply denoted as detection electrode Rx when it is not necessary to distinguish between them. Similarly, a first drive electrode Tx-1 and a second drive electrode Tx-2 may be simply denoted as drive electrode Tx when it is not necessary to distinguish between them.

Specifically, the first detection electrode Rx-1 has a first superimposed portion 51, a second superimposed portion 52, and a first connecting portion 58. The first superimposed portion 51 extends in a first extending direction D1 inclined relative to the first direction Dx and the second direction Dy. The second superimposed portion 52 extends in a second extending direction D2 intersecting the first extending direction D1. In the present embodiment, the first superimposed portion 51 and the second superimposed portion 52 are provided in line symmetry with respect to a virtual line parallel to the first direction Dx as the axis of symmetry. More preferably, the first superimposed portion 51 and the second superimposed portion 52 extend in orthogonal directions. The first connecting portion 58 extends in the second direction Dy and connects the first superimposed portion 51 and the second superimposed portion 52 in the second direction Dy.

A plurality of the first superimposed portions 51 and the second superimposed portions 52 are disposed alternately in the second direction Dy. The first connecting portion 58 connects an end of the first superimposed portion 51 and an end of the second superimposed portion 52 adjacent to each other in the second direction Dy. In this way, the first detection electrode Rx-1 is formed in a zigzag line pattern extending in the second direction Dy as a whole.

The second detection electrode Rx-2 has a third superimposed portion 53, a fourth superimposed portion 54, and a second connecting portion 59. The third superimposed portion 53 extends in the second extending direction D2. The fourth superimposed portion 54 extends in the first extending direction D1. In the present embodiment, the third superimposed portion 53 and the fourth superimposed portion 54 are provided in line symmetry with respect to a virtual line parallel to the first direction Dx as the axis of symmetry. More preferably, the third superimposed portion 53 and the fourth superimposed portion 54 extend in orthogonal directions. The second connecting portion 59 extends in the second direction Dy and connects the third superimposed portion 53 and the fourth superimposed portion 54 in the second direction Dy.

A plurality of the third superimposed portions 53 and the fourth superimposed portions 54 are disposed alternately in the second direction Dy. The second connecting portion 59 connects an end of the third superimposed portion 53 and an end of the fourth superimposed portion 54 adjacent to each other in the second direction Dy. In this way, the second detection electrode Rx-2 is formed in a zigzag line pattern extending in the second direction Dy as a whole.

The first connecting portion 58 of the first detection electrode Rx-1 and the second connecting portion 59 of the second detection electrode Rx-2 are disposed adjacent to each other in the first direction Dx. The first superimposed portion 51 and the third superimposed portion 53 are disposed in line symmetry with respect to a virtual line parallel to the second direction Dy as the axis of symmetry. The second superimposed portion 52 and the fourth superimposed portion 54 are disposed in line symmetry with respect to a virtual line parallel to the second direction Dy as the axis of symmetry. In this way, a plurality of the first detection electrodes Rx-1 and a plurality of the second detection electrodes Rx-2 are formed in a mesh-like pattern as a whole. In other words, in the first extending direction D1, the first superimposed portions 51 and the fourth superimposed portions 54 are arranged alternately on a straight line. In the second extending direction D2, the second superimposed portions 52 and the third superimposed portions 53 are arranged alternately on a straight line.

As illustrated in FIG. 4, the drive electrodes Tx each have the first drive electrode Tx-1 and the second drive electrode Tx-2. The drive electrode Tx is superimposed over the detection electrode Rx, and a third connecting portion 68 and a fourth connecting portion 69 of the drive electrode Tx are located between the first connecting portion 58 and the second connecting portion 59 adjacent to each other in the first direction Dx.

Figure 5:
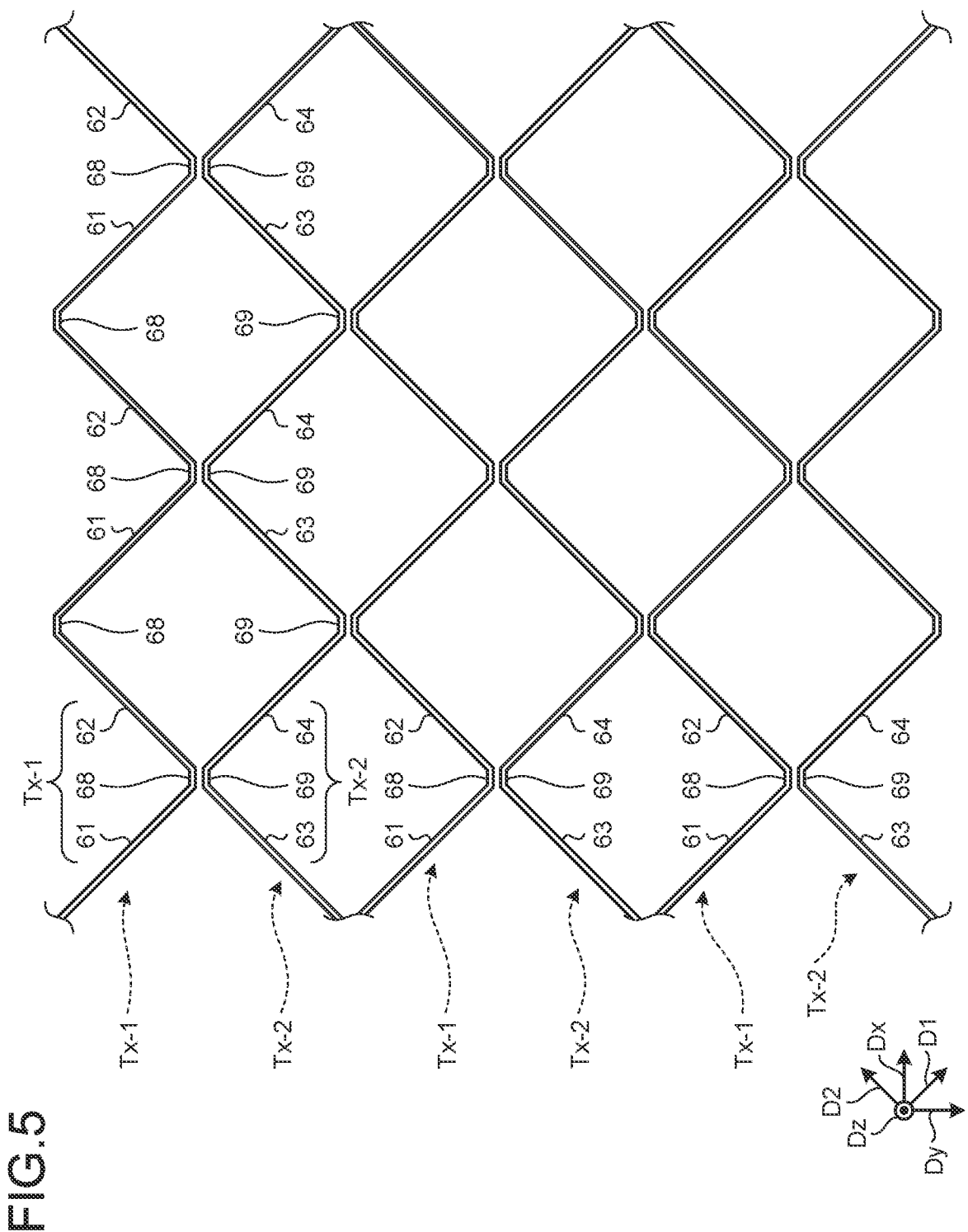
FIG. 5 is a plan view illustrating the drive electrodes according to the first embodiment.

FIG. 5 is a plan view illustrating the drive electrodes according to the first embodiment. FIG. 5 is a plan view schematically illustrating the configuration of the drive electrodes Tx, in which the detection electrodes Rx in FIG. 4 are eliminated for the sake of explanation. As illustrated in FIG. 5, in the second direction Dy, the first drive electrodes Tx-1 and the second drive electrodes Tx-2 are disposed alternately. The second drive electrode Tx-2 is disposed at a predetermined distance in the second direction Dy from the first drive electrode Tx-1. The second drive electrode Tx-2 is disposed in line symmetry with the first drive electrode Tx-1 with respect to a virtual line parallel to the first direction Dx as the axis of symmetry.

Specifically, the first drive electrode Tx-1 has a fifth superimposed portion 61, a sixth superimposed portion 62, and the third connecting portion 68. The fifth superimposed portion 61 extends in the first extending direction D1. The sixth superimposed portion 62 extends in the second extending direction D2. In the present embodiment, the fifth superimposed portion 61 and the sixth superimposed portion 62 are provided in line symmetry with respect to a virtual line parallel to the second direction Dy as the axis of symmetry. More preferably, the fifth superimposed portion 61 and the sixth superimposed portion 62 extend in orthogonal directions. The third connecting portion 68 extends in the first direction Dx and connects the fifth superimposed portion 61 and the sixth superimposed portion 62 in the first direction Dx.

A plurality of the fifth superimposed portions 61 and the sixth superimposed portions 62 are disposed alternately in the first direction Dx. The third connecting portion 68 connects an end of the fifth superimposed portion 61 and an end of the sixth superimposed portion 62 adjacent to each other in the first direction Dx. In this way, the first drive electrode Tx-1 is formed in a zigzag line pattern extending in the first direction Dx as a whole.

The second drive electrode Tx-2 has a seventh superimposed portion 63, an eighth superimposed portion 64, and the fourth connecting portion 69. The seventh superimposed portion 63 extends in the second extending direction D2. The eighth superimposed portion 64 extends in the first extending direction D1. In the present embodiment, the seventh superimposed portion 63 and the eighth superimposed portion 64 are provided in line symmetry with respect to a virtual line parallel to the second direction Dy as the axis of symmetry. More preferably, the seventh superimposed portion 63 and the eighth superimposed portion 64 extend in orthogonal directions. The fourth connecting portion 69 extends in the first direction Dx and connects the seventh superimposed portion 63 and the eighth superimposed portion 64 in the first direction Dx.

A plurality of the seventh superimposed portions 63 and the eighth superimposed portions 64 are disposed alternately in the first direction Dx. The fourth connecting portion 69 connects an end of the seventh superimposed portion 63 and an end of the eighth superimposed portion 64 adjacent to each other in the first direction Dx. In this way, the second drive electrode Tx-2 is formed in a zigzag line pattern extending in the first direction Dx as a whole.

The third connecting portion 68 of the first drive electrode Tx-1 and the fourth connecting portion 69 of the second drive electrode Tx-2 are disposed adjacent to each other in the second direction Dy. The fifth superimposed portion 61 and the seventh superimposed portion 63 are disposed in line symmetry with respect to a virtual line parallel to the first direction Dx as the axis of symmetry. The sixth superimposed portion 62 and the eighth superimposed portion 64 are disposed in line symmetry with respect to a virtual line parallel to the first direction Dx as the axis of symmetry. In this way, the first drive electrodes Tx-1 and the second drive electrodes Tx-2 are formed in a mesh-like pattern as a whole. In other words, in the first extending direction D1, the fifth superimposed portions 61 and the eighth superimposed portions 64 are arranged alternately on a straight line. In the second extending direction D2, the sixth superimposed portions 62 and the seventh superimposed portions 63 are arranged alternately on a straight line.

Figure 6:
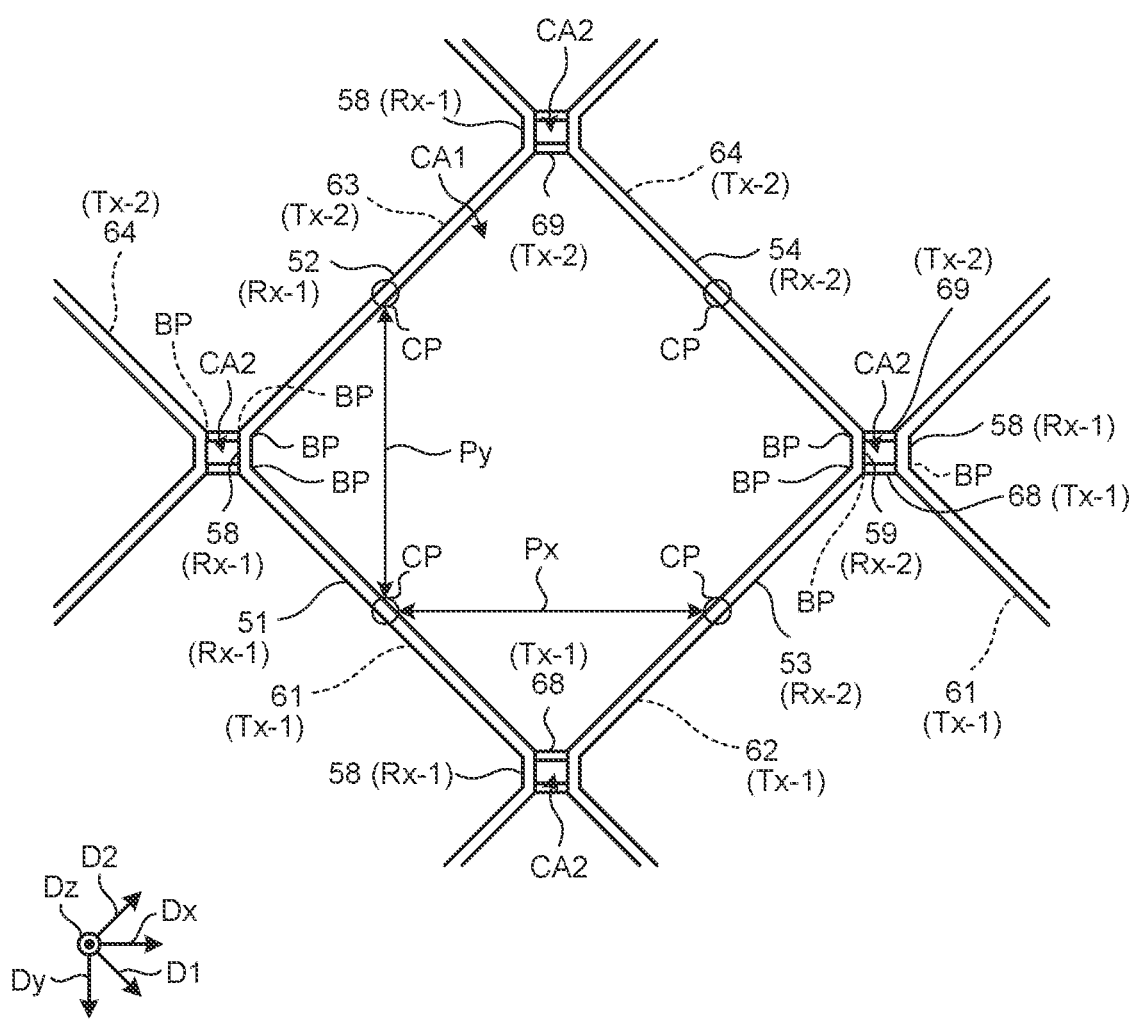
FIG. 6 is an enlarged plan view of region A in FIG. 4.

FIG. 6 is an enlarged plan view of region A in FIG. 4. As illustrated in FIG. 6, the fifth superimposed portion 61 to the eighth superimposed portion 64 of the drive electrode Tx and the first superimposed portion 51 to the fourth superimposed portion 54 of the detection electrode Rx are superimposed over each other and extend linearly in the same direction. In a planar view from the third direction Dz, a plurality of superimposed portions including the first superimposed portion 51 to the eighth superimposed portion 64 and a plurality of connecting portions including the first connecting portion 58 to the fourth connecting portion 69 form a first closed region CA1 closed annularly.

Specifically, the fifth superimposed portion 61 of the first drive electrode Tx-1 and the first superimposed portion 51 of the first detection electrode Rx-1 are superimposed and extend linearly in the first extending direction D1. The sixth superimposed portion 62 of the first drive electrode Tx-1 and the third superimposed portion 53 of the second detection electrode Rx-2 are superimposed and extend linearly in the second extending direction D2. The seventh superimposed portion 63 of the second drive electrode Tx-2 and the second superimposed portion 52 of the first detection electrode Rx-1 are superimposed and extend linearly in the second extending direction D2. The eighth superimposed portion 64 of the second drive electrode Tx-2 and the fourth superimposed portion 54 of the second detection electrode Rx-2 are superimposed and extend linearly in the first extending direction D1. Each superimposed portion of the drive electrode Tx is formed with the same width and in the same extending direction as each superimposed portion of the detection electrode Rx and therefore is not illustrated in FIG. 6.

The first superimposed portion 51 and the first connecting portion 58 adjacent to each other in the second direction Dy are connected with a bent portion BP interposed therebetween. The second superimposed portion 52 and the first connecting portion 58 adjacent to each other in the second direction Dy are connected with a bent portion BP interposed therebetween. The third connecting portion 68 of the first drive electrode Tx-1 is located between the first superimposed portion 51 and the third superimposed portion 53 adjacent to each other in the first direction Dx. The third superimposed portion 53 and the second connecting portion 59 adjacent to each other in the second direction Dy are connected with a bent portion BP interposed therebetween. The fourth superimposed portion 54 and the second connecting portion 59 adjacent to each other in the second direction Dy are connected with a bent portion BP interposed therebetween. The fourth connecting portion 69 of the second drive electrode Tx-2 is located between the second superimposed portion 52 and the fourth superimposed portion 54 adjacent to each other in the first direction Dx. In this way, in a planar view, the first closed region CA1 is formed in an octagonal shape in which four superimposed portions and four connecting portions are disposed alternately. However, in a planar view, the first closed region CA1 may be formed in a polygonal shape with eight or more sides such that four or more superimposed portions and four or more connecting portions are disposed alternately.

A plurality of the first closed regions CA1 are arranged in the first direction Dx and the second direction Dy. A second closed region CA2 is formed between the first closed regions CA1 adjacent to each other in the first direction Dx and the second direction Dy. The second closed region CA2 is a quadrangular region surrounded by the first connecting portion 58, the second connecting portion 59, the third connecting portion 68, and the fourth connecting portion 69. The second closed region CA2 is provided between the first closed regions CA1 adjacent to each other in the first direction Dx and provided between the first closed regions CA1 adjacent to each other in the second direction Dy. In other words, four first closed regions CA1 are provided so as to surround one second closed region CA2. Alternatively, four second closed regions CA2 are provided for one first closed region CA1.

A capacitance is formed between the fifth superimposed portion 61 of the drive electrode Tx and the first superimposed portion 51 of the detection electrode Rx superimposed over each other. Similarly, a capacitance is formed between the sixth superimposed portion 62 and the third superimposed portion 53. A capacitance is formed between the seventh superimposed portion 63 and the second superimposed portion 52. A capacitance is formed between the eighth superimposed portion 64 and the fourth superimposed portion 54. The detection device 100 performs fingerprint detection based on capacitance change at each superimposed portion. Here, a midpoint CP is the midpoint position in the extending direction of each superimposed portion. The detection pitch Px in the first direction Dx in the detection device 100 is equal to the distance between the midpoints CP adjacent in the first direction Dx. The detection pitch Py in the second direction Dy in the detection device 100 is equal to the distance between the midpoints CP adjacent in the second direction Dy.

The length in the extending direction of each superimposed portion is sufficiently longer than the length in the extending direction of each connecting portion. In other words, the area of the first closed region CA1 is larger than the area of the second closed region CA2. In this configuration, the superimposed area between the drive electrode Tx and the detection electrode Rx can be increased.

As described above, the detection device 100 in the present embodiment includes the substrate 101, the drive electrodes Tx, and the detection electrodes Rx. The drive electrodes Tx are provided on the substrate 101, each extend in the first direction Dx, and are arranged in the second direction Dy intersecting the first direction Dx.

The detection electrodes Rx are opposed to the drive electrodes Tx, each extend in the second direction Dy, and are arranged in the first direction Dx. The drive electrodes Tx and the detection electrodes Rx have a plurality of superimposed portions (the first superimposed portion 51 to the fourth superimposed portion 54 and the fifth superimposed portion 61 to the eighth superimposed portion 64) and connecting portions connecting the superimposed portions (the first connecting portion 58, the second connecting portion 59, the third connecting portion 68, and the fourth connecting portion 69). The superimposed portions (the fifth superimposed portion 61 to the eighth superimposed portion 64) of the drive electrode Tx and the superimposed portions (the first superimposed portion 51 to the fourth superimposed portion 54) of the detection electrode Rx are superimposed over each other and extend linearly in the same direction. In a planar view from the third direction Dz, a plurality of superimposed portions and a plurality of connecting portions form the first closed region CA1 closed annularly.

In this configuration, the capacitance formed between each superimposed portion of the drive electrode Tx and a corresponding superimposed portion of the detection electrode Rx can be increased, compared with a configuration in which the drive electrode Tx and the detection electrode Rx intersect in a planar view. As a result, the detection device 100 can improve the signal-to-noise ratio of fingerprint detection.

In the detection device 100, the area in which the drive electrode Tx and the detection electrode Rx are superimposed is increased, compared with the configuration in which the drive electrode Tx and the detection electrode Rx intersect in a planar view. In other words, the opening area where the drive electrode Tx and the detection electrode Rx are not provided can be increased in the detection region FA. As a result, the detection device 100 can suppress decrease in transmittance even when the detection pitches Px and Py are reduced.

The first drive electrode Tx-1 and the second drive electrode Tx-2 are provided in line symmetry, and the first detection electrode Rx-1 and the second detection electrode Rx-2 are provided in line symmetry. In this configuration, the superimposed portions adjacent in the first direction Dx extend in different directions. Similarly, the superimposed portions adjacent in the second direction Dy extend in different directions. This configuration can prevent formation of a region strongly reflecting light in a particular direction, because the electrodes are not aligned in the same direction. Thus, when external light is incident on the detection device 100, unevenness of intensity of reflected light among certain regions can be suppressed.

The detection device 100 therefore does not require dummy electrodes for suppressing formation of a striped pattern by reflected light. Since the detection device 100 has no dummy electrodes, decrease in transmittance light can be suppressed. The first closed region CA1 is formed in an octagonal shape. Thus, when the display panel 30 is stacked, formation of moiré between the drive electrodes Tx and the detection electrodes Rx, and the pixel array of the display panel 30 can be suppressed.

Second Embodiment

Figure 7:
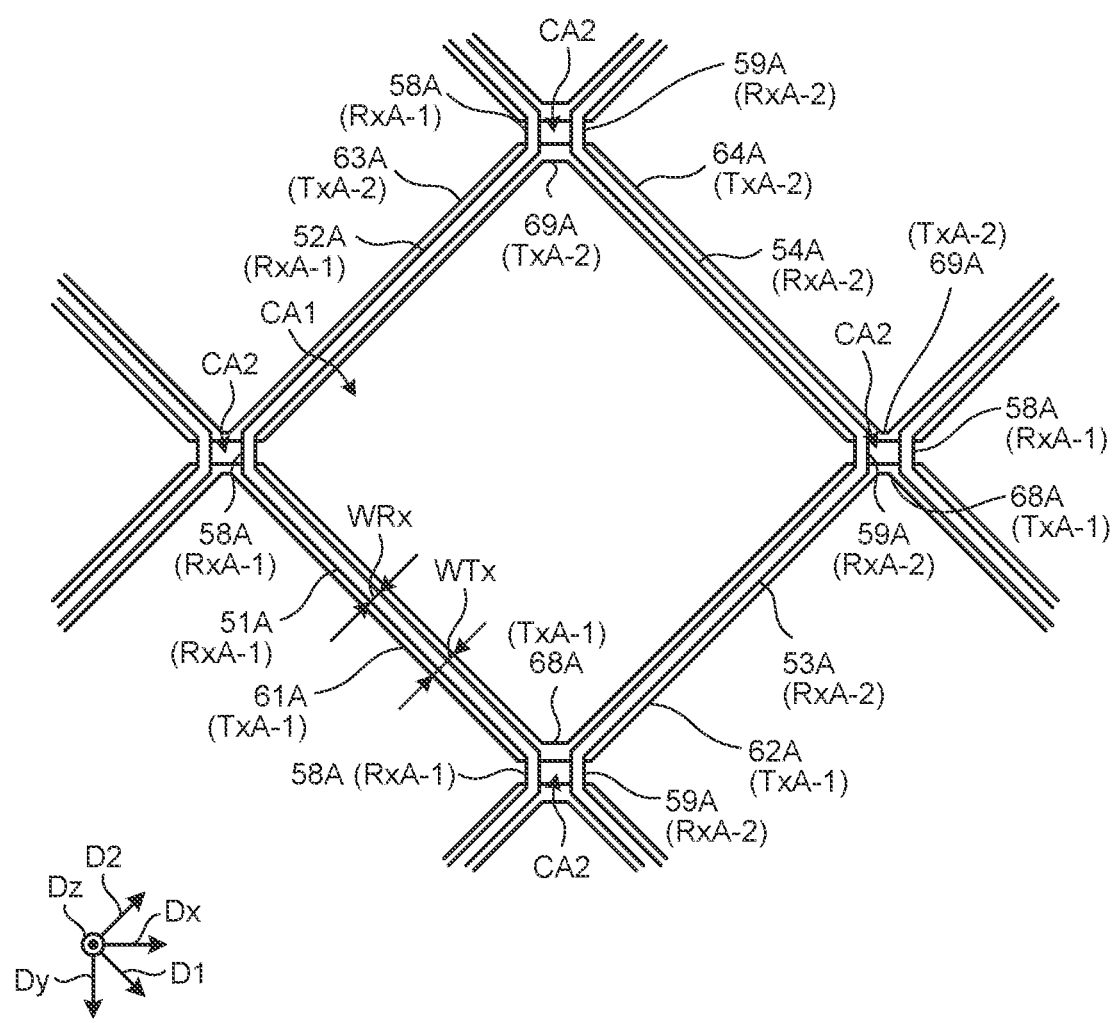
FIG. 7 is a plan view illustrating drive electrodes and detection electrodes according to a second embodiment.

FIG. 7 is a plan view illustrating drive electrodes and detection electrodes according to a second embodiment. In the following description, the same constituent elements as those described in the foregoing embodiment are denoted by the same signs and an overlapping description will be omitted. In the second embodiment, a configuration in which the width of a drive electrode TxA and the width of a detection electrode RxA are different will be described.

As illustrated in FIG. 7, the width WTx of a fifth superimposed portion 61A of a first drive electrode TxA-1 is larger than the width WRx of a first superimposed portion 51A of a first detection electrode RxA-1 superimposed above the fifth superimposed portion 61A. Similarly, the width WTx of a sixth superimposed portion 62A of the first drive electrode TxA-1 is larger than the width WRx of a third superimposed portion 53A of a second detection electrode RxA-2. The width WTx of a seventh superimposed portion 63A of a second drive electrode TxA-2 is larger than the width WRx of a second superimposed portion 52A of the first detection electrode RxA-1. The width WTx of an eighth superimposed portion 64A of the second drive electrode TxA-2 is larger than the width WRx of a fourth superimposed portion 54A of the second detection electrode RxA-2.

The width in the second direction Dy of a third connecting portion 68A and a fourth connecting portion 69A is larger than the width in the first direction Dx of a first connecting portion 58A and a second connecting portion 59A.

In this way, in the second embodiment, the width of the drive electrode TxA is larger than the width of the detection electrode RxA. With this configuration, when a drive signal is supplied to the drive electrode TxA, a fringe electrical field is formed to extend from the drive electrode TxA toward the first surface 80a (see FIG. 2) of the cover member 80. With this configuration, the detection device 100 can improve the detection sensitivity.

Third Embodiment

Figure 8:
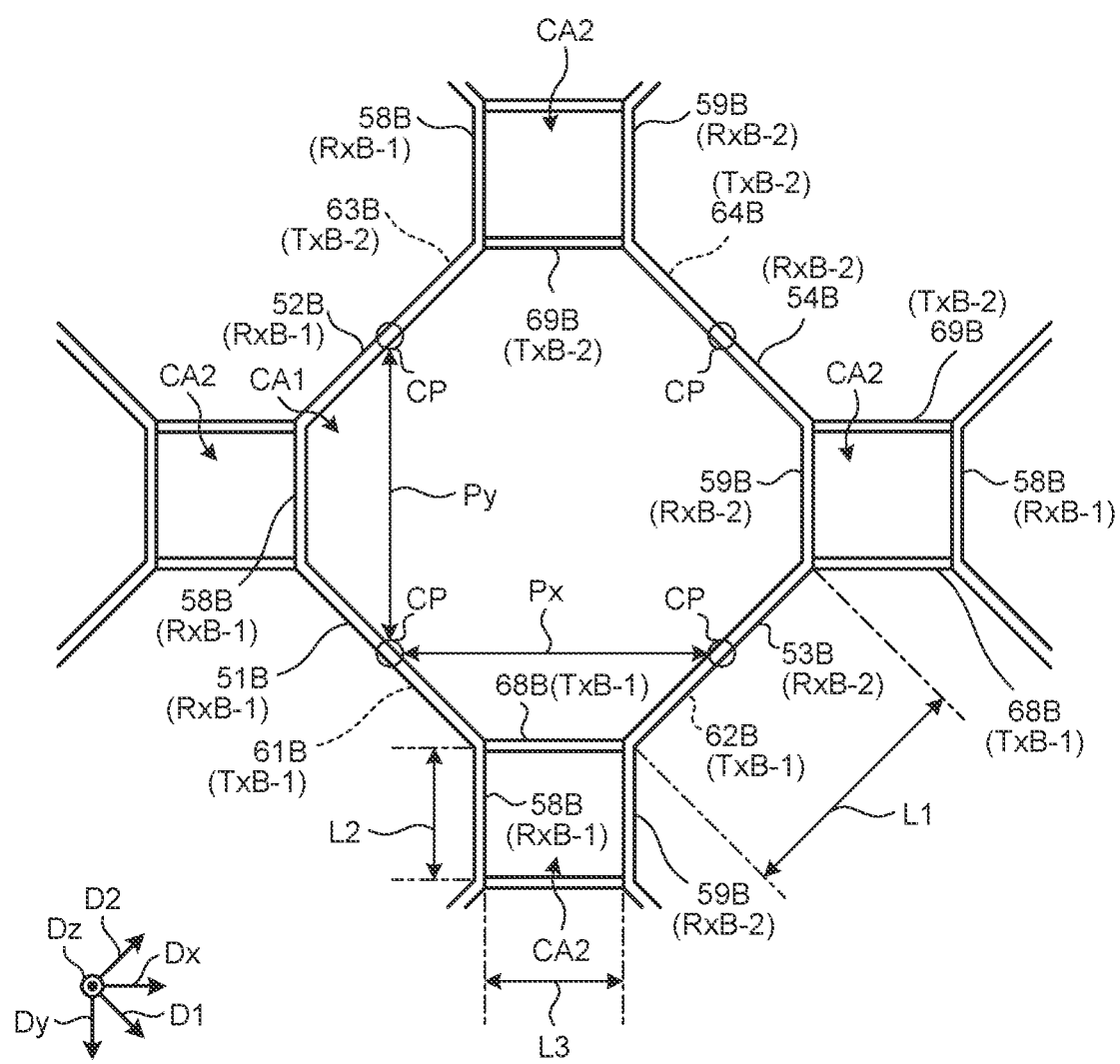
FIG. 8 is a plan view illustrating drive electrodes and detection electrodes according to a third embodiment.

FIG. 8 is a plan view illustrating drive electrodes and detection electrodes according to a third embodiment. In the third embodiment, a configuration in which the length L1 of each superimposed portion is shorter than that in the foregoing first and second embodiments will be described.

As illustrated in FIG. 8, the length L1 in the extending direction of each superimposed portion (a first superimposed portion 51B and a second superimposed portion 52B of a first detection electrode RxB-1, a third superimposed portion 53B and a fourth superimposed portion 54B of a second detection electrode RxB-2, a fifth superimposed portion 61B and a sixth superimposed portion 62B of a first drive electrode TxB-1, a seventh superimposed portion 63B and an eighth superimposed portion 64B of a second drive electrode TxB-2) is shorter than that in the first and second embodiments. The length L2 in the second direction Dy of a first connecting portion 58B and a second connecting portion 59B is longer than that in the first and second embodiments. The length L3 in the first direction Dx of a third connecting portion 68B and a fourth connecting portion 69B is longer than that in the first and second embodiments. In other words, in the third embodiment, the area of the first closed region CA1 is smaller and the area of the second closed region CA2 is larger than those in the foregoing first and second embodiments.

In the present embodiment, the ratio of the length of the connecting portions extending in the first direction Dx and the second direction Dy to the length of the superimposed portions extending in the first extending direction D1 and the second extending direction D2 can be increased in drive electrodes TxB and detection electrodes RxB.

In the present embodiment, the superimposed area between the drive electrode TxB and the detection electrode RxB can be changed while the detection pitches Px and Py are kept constant. In the detection device 100, therefore, the capacitance between the drive electrode TxB and the detection electrode RxB and the opening ratio can be adjusted appropriately while the detection pitches Px and Py are kept constant.

Fourth Embodiment

Figure 9:
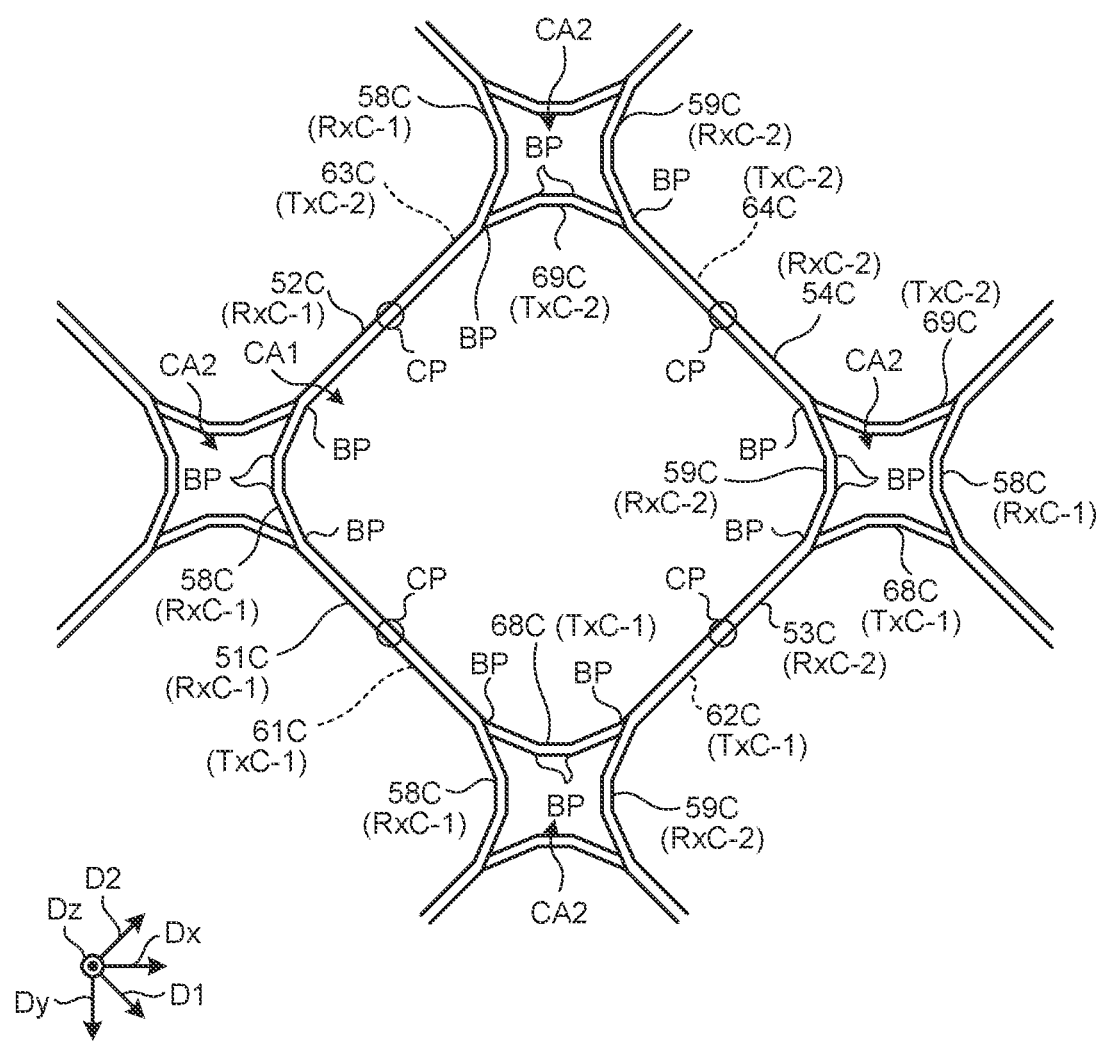
FIG. 9 is a plan view illustrating drive electrodes and detection electrodes according to a fourth embodiment.

FIG. 9 is a plan view illustrating drive electrodes and detection electrodes according to a fourth embodiment. In the fourth embodiment, unlike the foregoing first to third embodiments, a configuration in which the first closed region CA1 is formed in a hexadecagonal shape will be described.

As illustrated in FIG. 9, a first connecting portion 58C of a first detection electrode RxC-1 has three linear portions and two bent portions BP connecting a plurality of linear portions. A bent portion BP is formed at the connection point between the first connecting portion 58C and a first superimposed portion 51C. A bent portion BP is formed at the connection point between the first connecting portion 58C and a second superimposed portion 52C. Similarly, each of a second connecting portion 59C of a second detection electrode RxC-2, a third connecting portion 68C of a first drive electrode TxC-1, and a fourth connecting portion 69C of a second drive electrode TxC-2 that constitute the first closed region CA1 has three linear portions and two bent portions BP. Thus, the first closed region CA1 is formed in a hexadecagonal shape protruding outward. The second closed region CA2 surrounded by four connecting portions is formed in a dodecagonal shape recessed inward.

In the present embodiment, the drive electrode TxC and the detection electrode RxC each have portions extending in different directions, such as the first direction Dx, the second direction Dy, the first extending direction D1, and the second extending direction D2.

Fifth Embodiment

Figure 10:
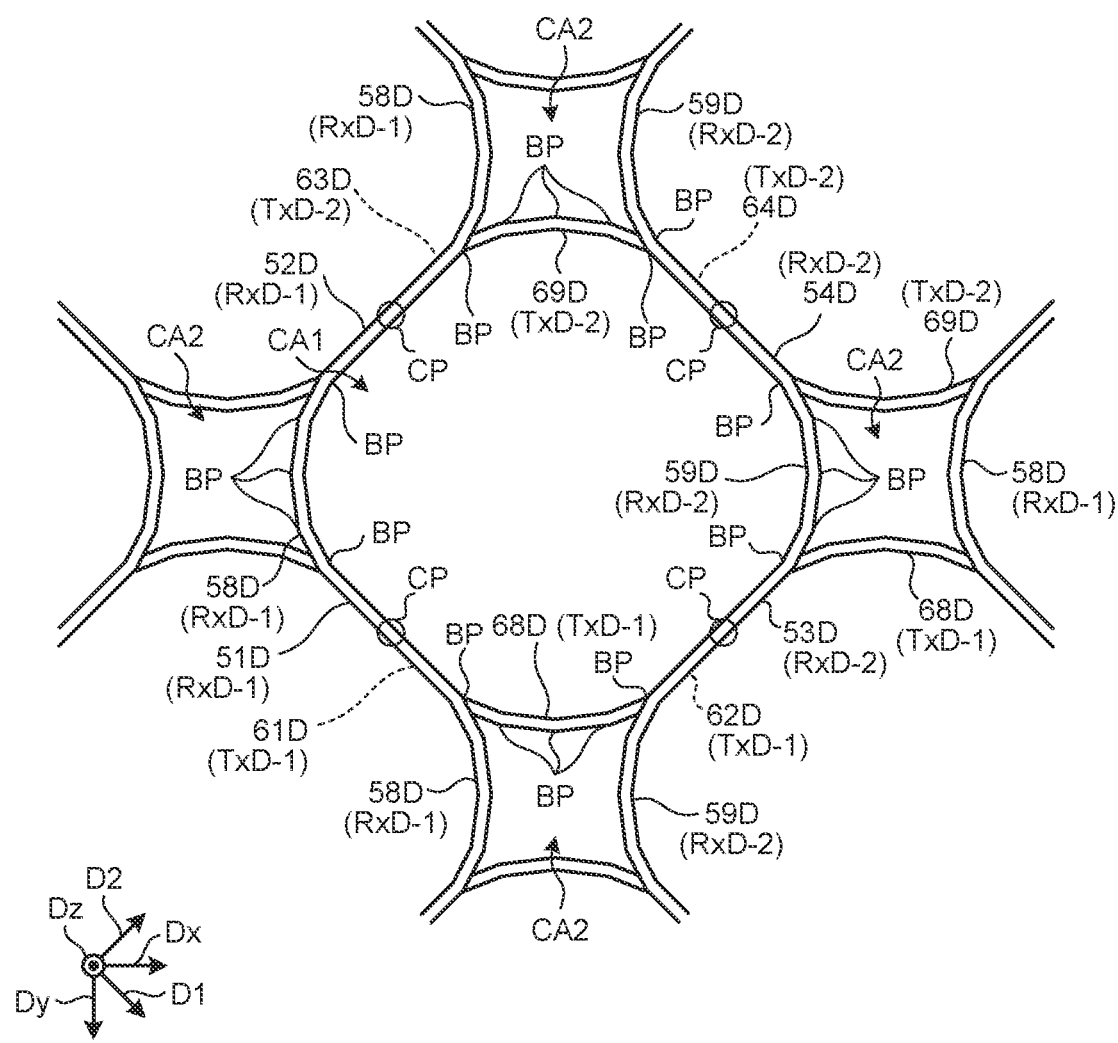
FIG. 10 is a plan view illustrating drive electrodes and detection electrodes according to a fifth embodiment.

FIG. 10 is a plan view illustrating drive electrodes and detection electrodes according to a fifth embodiment. In the fifth embodiment, a configuration in which the first closed region CA1 is formed in an icosagonal shape will be described.

As illustrated in FIG. 10, a first connecting portion 58D of a first detection electrode RxD-1 has four linear portions connected by three bent portions BP. A bent portion BP is formed at the connection point between the first connecting portion 58D and a first superimposed portion 51D. A bent portion BP is formed at the connection point between the first connecting portion 58D and a second superimposed portion 52D. Similarly, each of a second connecting portion 59D of a second detection electrode RxD-2, a third connecting portion 68D of a first drive electrode TxD-1, and a fourth connecting portion 69D of a second drive electrode TxD-2 that constitute the first closed region CA1 has four linear portions and three bent portions BP. Thus, the first closed region CA1 is formed in an icosagonal shape protruding outward. The second closed region CA2 surrounded by four connecting portions is formed in a hexadecagonal shape recessed inward.

In the present embodiment, the drive electrode TxD and the detection electrode RxD each have many bent portions BP, and, for example, the first superimposed portion 51D, the first connecting portion 58D, and the second superimposed portion 52D are smoothly connected and formed to be curved along a part of an arc.

Sixth Embodiment

Figure 11:
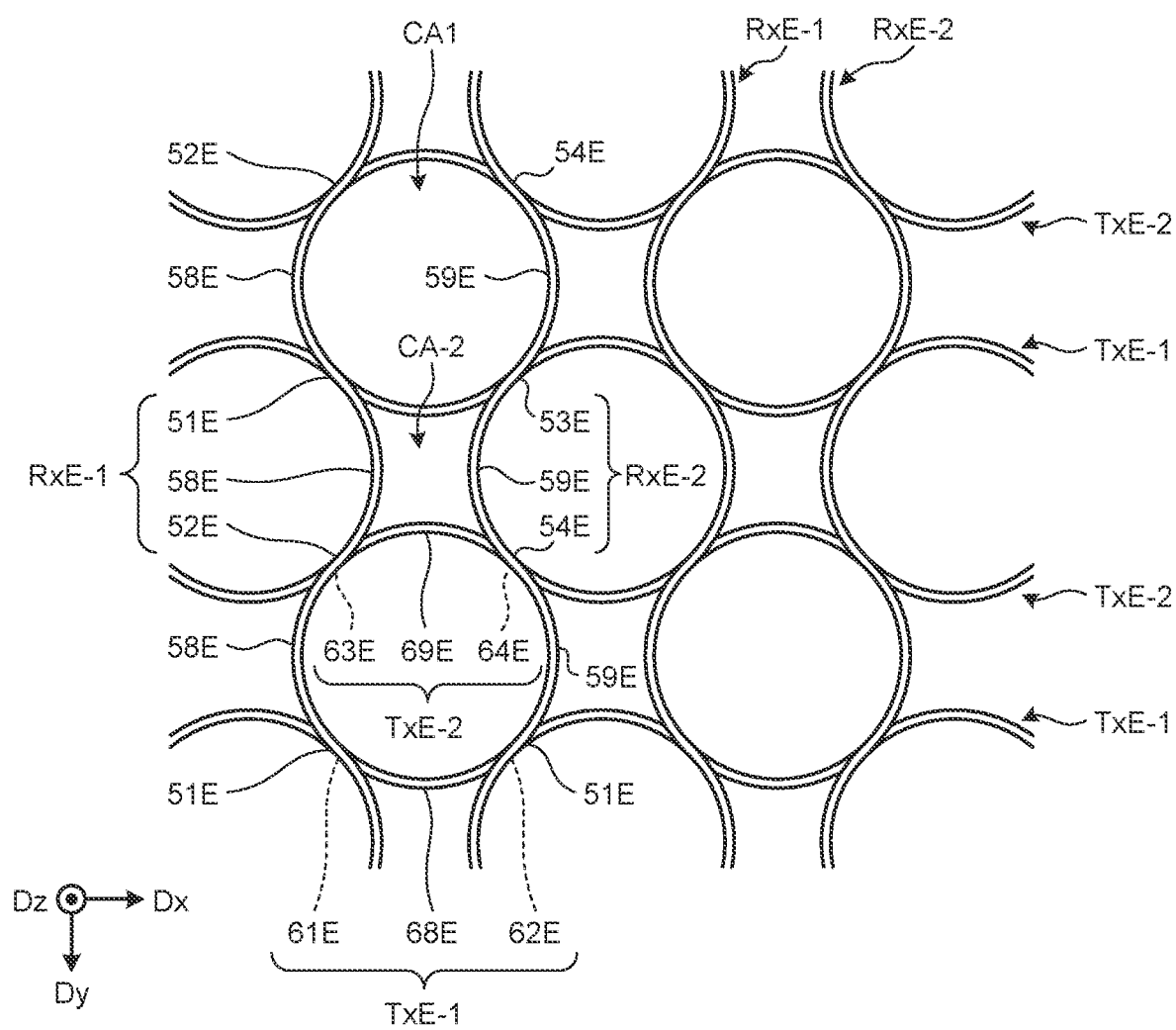
FIG. 11 is a plan view illustrating drive electrodes and detection electrodes according to a sixth embodiment.

FIG. 11 is a plan view illustrating drive electrodes and detection electrodes according to a sixth embodiment. In the sixth embodiment, a configuration in which drive electrodes TxD and detection electrodes RxD are each formed in a wavy line with a plurality of curved portions will be described.

As illustrated in FIG. 11, a fifth superimposed portion 61E, a sixth superimposed portion 62E, and a third connecting portion 68E of a first drive electrode TxE-1 extend along a part of an arc. The first drive electrode TxE-1 is formed such that arcs each formed with the fifth superimposed portion 61E, the sixth superimposed portion 62E, and the third connecting portion 68E are connected into a wavy line in the first direction Dx. A first drive electrode TxE-2 is formed in line symmetry with the first drive electrode TxE-1 with respect to a virtual line parallel to the first direction Dx as the axis of symmetry.

A first superimposed portion 51E, a second superimposed portion 52E, and a first connecting portion 58E of a first detection electrode RxE-1 extend along a part of an arc. The first detection electrode RxE-1 is formed such that arcs each formed with the first superimposed portion 51E, the second superimposed portion 52E, and the first connecting portion 58E are connected into a wavy line in the second direction Dy. A second detection electrode RxE-2 is formed in line symmetry with the first detection electrode RxE-1 with respect to a virtual line parallel to the second direction Dy as the axis of symmetry. In the sixth embodiment, the first closed region CA1 is formed in a ring shape, and the second closed region CA2 is formed in a quadrangular shape having sides curved inward.

Seventh Embodiment

Figure 12:
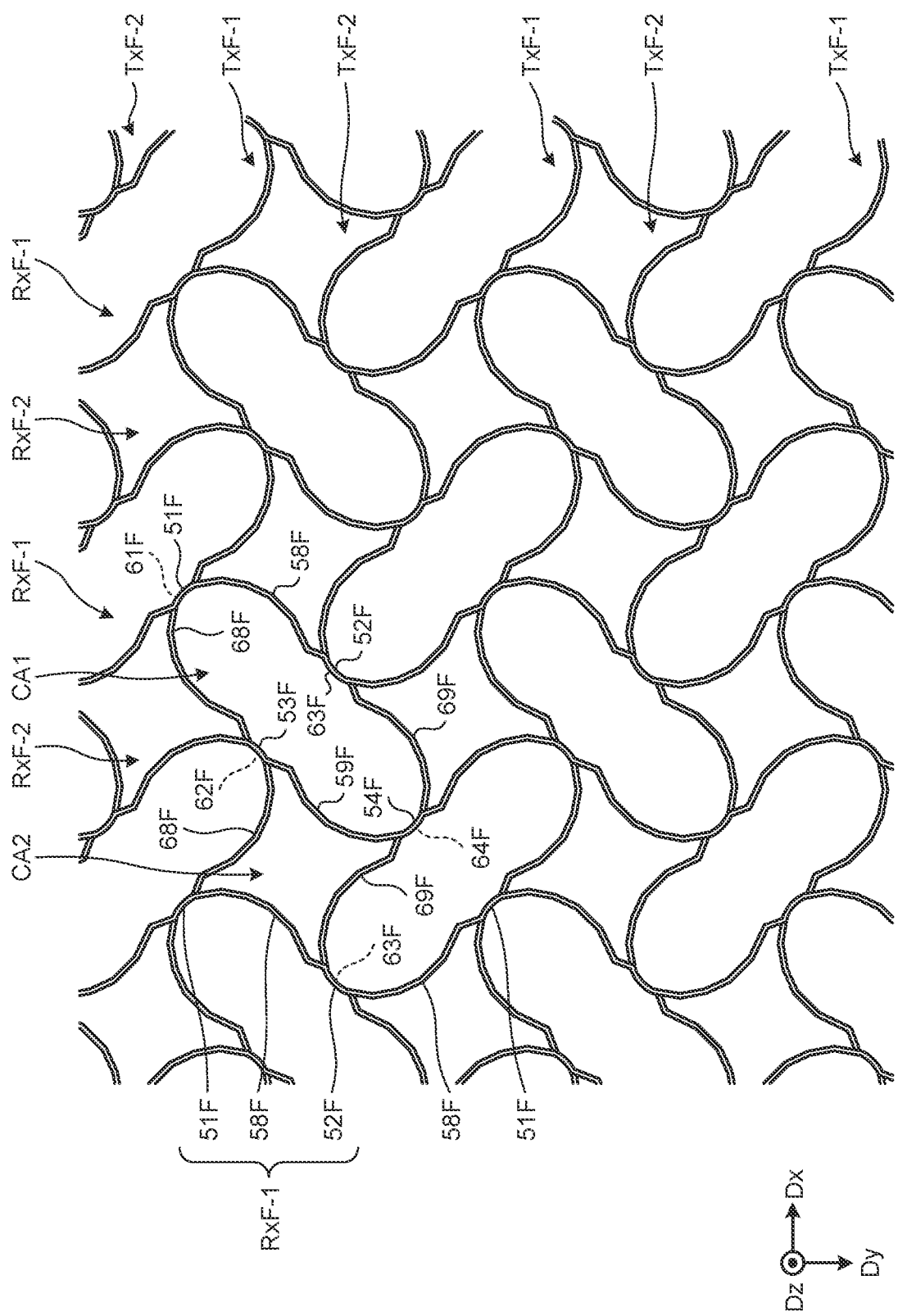
FIG. 12 is a plan view illustrating drive electrodes and detection electrodes according to a seventh embodiment.

FIG. 12 is a plan view illustrating drive electrodes and detection electrodes according to a seventh embodiment. In the seventh embodiment, a configuration in which each of drive electrodes TxD and detection electrodes RxD has a plurality of linear portions and a plurality of curved portions connected in a bending manner will be described.

As illustrated in FIG. 12, a fifth superimposed portion 61F and a sixth superimposed portion 62F and a third connecting portion 68F of a first drive electrode TxF-1 have curved portions curved along parts of different arcs and a plurality of linear portions, and the curved portions and the linear portions are connected in a bending manner. A seventh superimposed portion 63F, an eighth superimposed portion 64F, and a fourth connecting portion 69F of a second drive electrode TxF-2 have curved portions curved along parts of different arcs and a plurality of linear portions, and the curved portions and the linear portions are connected in a bending manner.

A first superimposed portion 51F, a second superimposed portion 52F, and a first connecting portion 58F of a first detection electrode RxF-1 have curved portions curved along parts of different arcs and a plurality of linear portions, and the curved portions and the linear portions are connected in a bending manner. A third superimposed portion 53F, a fourth superimposed portion 54F, and a second connecting portion 59F of a second detection electrode RxF-2 have curved portions curved along parts of different arcs and a plurality of linear portions, and the curved portions and the linear portions are connected in a bending manner. In the seventh embodiment, in the first closed region CA1 and the second closed region CA2, a plurality of curved portions and a plurality of linear portions are connected in a bending manner. The first closed region CA1 is formed in an approximately oval shape having its major axis inclined relative to the first direction Dx and the second direction Dy.

Figure 13:
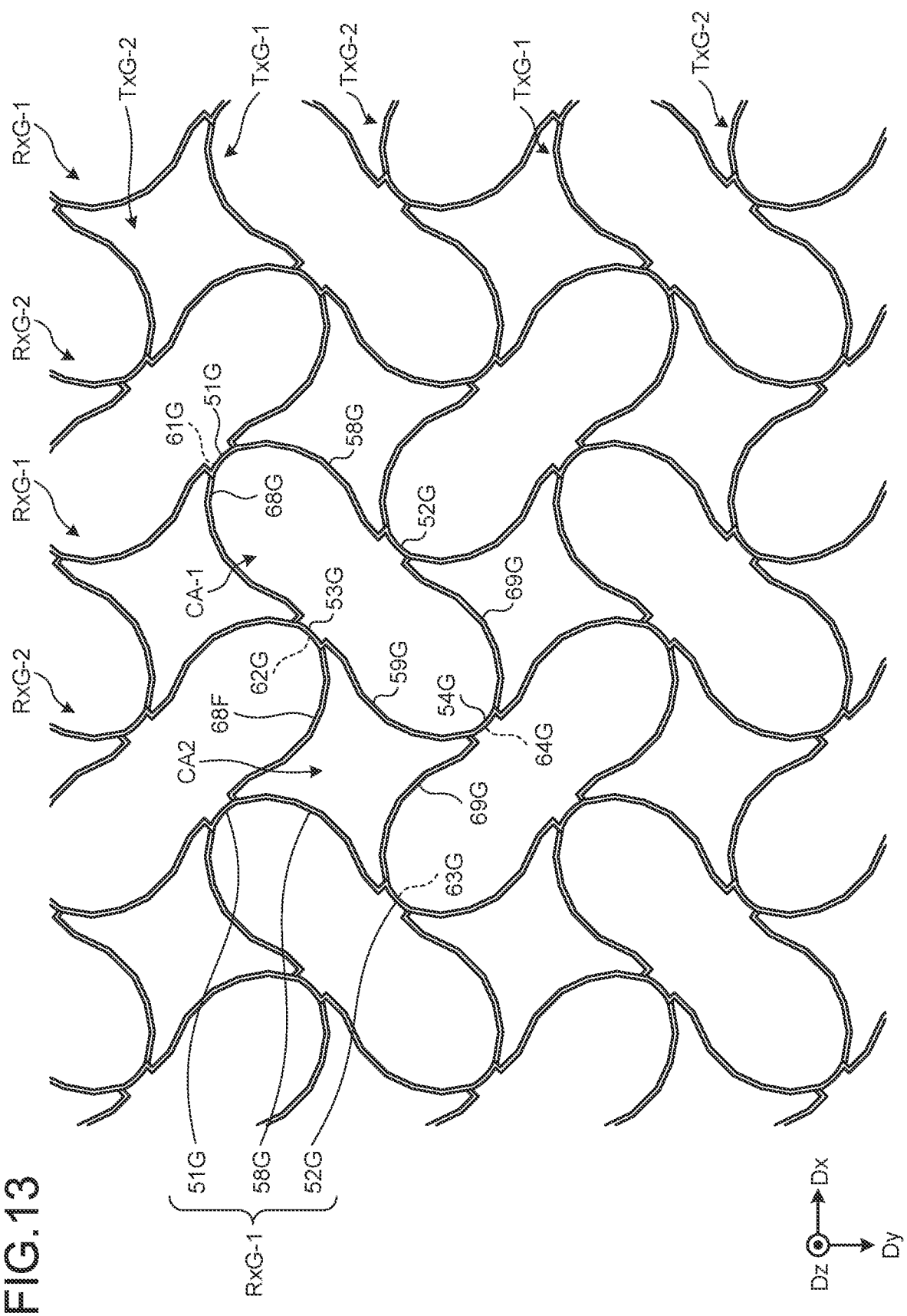
FIG. 13 is a plan view illustrating drive electrodes and detection electrodes according to a modification to the seventh embodiment.

FIG. 13 is a plan view illustrating drive electrodes and detection electrodes according to a modification to the seventh embodiment. As illustrated in FIG. 13, in a first drive electrode TxG-1 according to the modification, an end of a third connecting portion 68G is bent and connected to a sixth superimposed portion 62G. This is applicable to a second drive electrode TxG-2, a first detection electrode RxG-1, and a second detection electrode RxG-2. In this way, the shapes of the drive electrode Tx and the detection electrode Rx in a planar view can be modified as appropriate.

EXAMPLES

Figure 14:
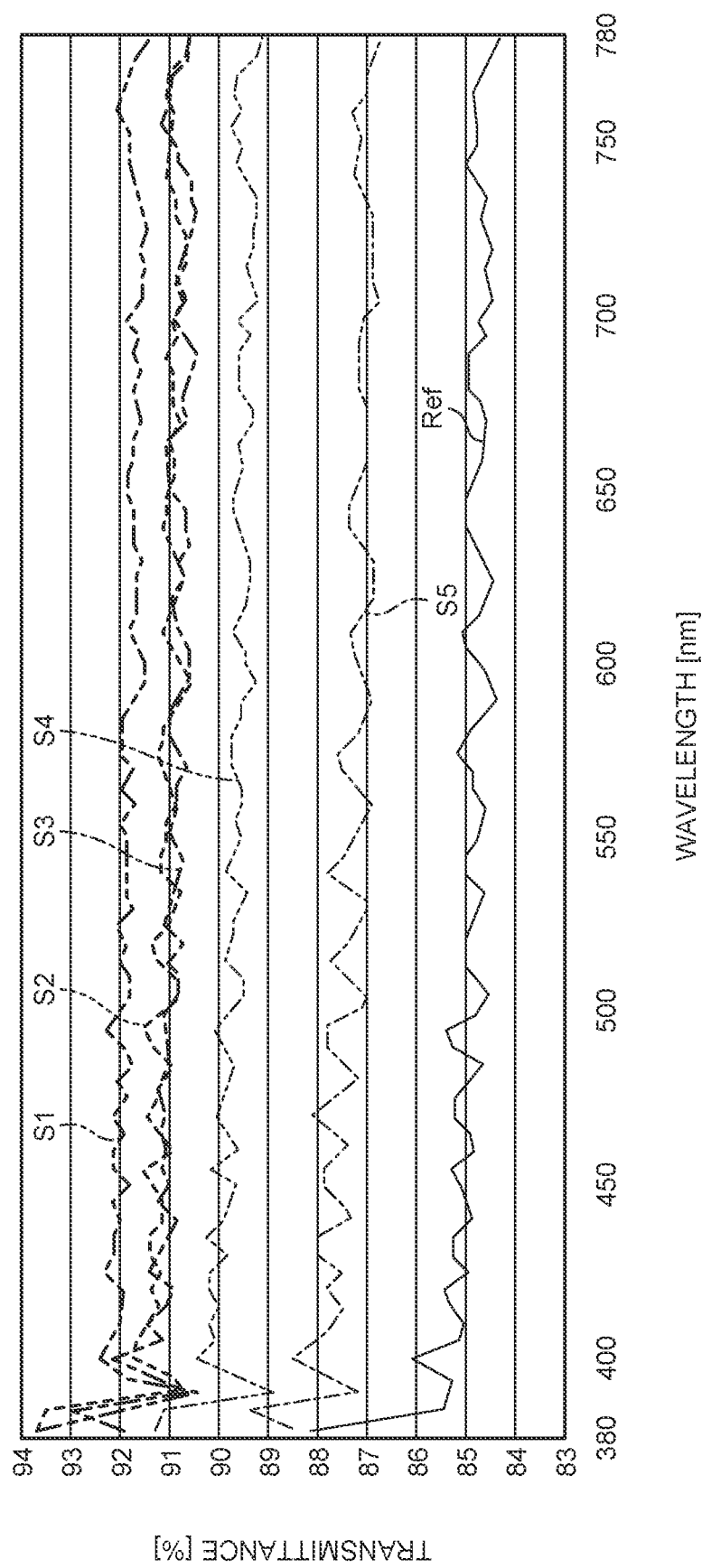
FIG. 14 is a graph illustrating the relation between the transmittance and the wavelength in the detection device according to examples.

FIG. 14 is a graph illustrating the relation between the transmittance and the wavelength in the detection device according to examples. Samples S1, S2, S3, S4, and S5 illustrated in FIG. 14 correspond to detection devices 100 having the sensor patterns of the first, third, fourth, sixth, and seventh embodiments, respectively. A comparative example Ref has a sensor pattern in which zigzag lines intersect.

As illustrated in FIG. 14, samples S1, S2, S3, S4, and S5 all exhibit a higher transmittance than comparative example Ref. Samples S1, S2, S3, S4, and S5 all have a transmittance characteristic that is flat in a range of wavelengths of 400 nm to 780 nm.

Although preferred embodiments of the present disclosure have been described above, the present disclosure is not limited to such embodiments. The specifics disclosed in the embodiments are only by way of example and are susceptible to various modifications without departing from the spirit of the disclosure. Any modifications made as appropriate without departing from the spirit of the disclosure naturally fall into the technical scope of the present disclosure.

What is claimed is:

1. A detection device comprising:
   a substrate;
   a plurality of drive electrodes disposed at the substrate, each extending in a first direction, and arranged in a second direction intersecting the first direction; and
   a plurality of detection electrodes opposed to the drive electrodes, each extending in the second direction, and arranged in the first direction, wherein
   each of the drive electrodes and the detection electrodes has a plurality of superimposed portions and a connecting portion connecting the superimposed portions,
   one of the superimposed portions of one of the drive electrodes and one of the superimposed portions of one of the detection electrodes are superimposed over each other and extend linearly in a same direction, and
   in a planar view from a direction perpendicular to a main surface of the substrate, some of the superimposed portions and some of the connection portions form a first closed region closed annularly, wherein
   the detection device further comprises a plurality of first closed regions including the first closed region,
   the first closed regions are arranged in the first direction,
   a second closed region surrounded by some of the connecting portions is disposed between the first closed regions adjacent to each other in the first direction, and
   the second closed region is closed annularly and has a portion where neither the drive electrodes nor the detection electrodes are located.

2. The detection device according to claim 1, wherein the first closed region is formed in a polygonal shape in which four or more the superimposed portions and four or more the connecting portions are alternately disposed in a planar view.

3. The detection device according to claim 1, wherein each of the connecting portions has a plurality of linear portions and at least one or more bent portions formed by connecting the linear portions.

4. The detection device according to claim 1, wherein a length along an extending direction of the superimposed portion is longer than a length along an extending direction of the connecting portion.

5. The detection device according to claim 1, wherein
   the detection electrodes include
      a first detection electrode and
      a second detection electrode disposed at a predetermined distance in the first direction from the first detection electrode and in line symmetry with the first detection electrode with respect to the second direction as an axis of symmetry,
   the first detection electrode and the second detection electrode are each formed of a metal wire,
   the first detection electrode has
      a first superimposed portion extending in a first extending direction inclined relative to the first direction and the second direction,
      a second superimposed portion extending in a second extending direction intersecting the first extending direction, and
      a first connecting portion connecting the first superimposed portion and the second superimposed portion in the second direction, and
   the second detection electrode has
      a third superimposed portion extending in the second extending direction,
      a fourth superimposed portion extending in the first extending direction, and
      a second connecting portion connecting the third superimposed portion and the fourth superimposed portion in the second direction.

6. The detection device according to claim 5, wherein
   the drive electrodes include
      a first drive electrode and
      a second drive electrode disposed at a predetermined distance in the second direction from the first drive electrode and in line symmetry with the first drive electrode with respect to the first direction as an axis of symmetry,
   the first drive electrode and the second drive electrode are each formed of a metal wire,
   the first drive electrode has
      a fifth superimposed portion extending in the first extending direction and superimposed over the first superimposed portion,
      a sixth superimposed portion extending in the second extending direction and superimposed over the third superimposed portion, and
      a third connecting portion connecting the fifth superimposed portion and the sixth superimposed portion in the first direction, and the second drive electrode has
- a seventh superimposed portion extending in the second extending direction and superimposed over the second superimposed portion,
- an eighth superimposed portion extending in the first extending direction and superimposed over the fourth superimposed portion, and
- a fourth connecting portion connecting the seventh superimposed portion and the eighth superimposed portion in the first direction.

7. The detection device according to claim 1, wherein
the superimposed portions and the connecting portion of the drive electrode extend along a part of an arc, and the drive electrode extends in a wavy line,
the superimposed portions and the connecting portion of the detection electrode extend along a part of an arc, and the detection electrode extends in a wavy line, and
the first closed region is formed in a ring shape.

8. A display device comprising:
the detection device according to claim 1; and
a display panel opposed to the detection device.

9. The detection device according to claim 1, wherein two of the connecting portions of the drive electrodes and two of the connecting portions of the detection electrodes form the second closed region.

10. The detection device according to claim 9, wherein
the two of the connecting portions of the drive electrodes face each other, and the two of the connecting portions of the detection electrodes face each other.

\* \* \* \* \*